United States Patent [19]

Schwarz et al.

[11] 4,352,632

[45] Oct. 5, 1982

[54] ROTOR MOUNTING ASSEMBLY FOR ROTARY WING AIRCRAFT

[75] Inventors: Alois Schwarz, Putzbrunn; Karlheinz Mautz; Alexander Schröder, both of Ottobrunn, all of Fed. Rep. of Germany

[73] Assignee: Messerschmitt-Bölkow-Blohm Gesellschaft mit beschränkter Haftung, Munich, Fed. Rep. of Germany

[21] Appl. No.: 231,042

[22] Filed: Feb. 4, 1981

[30] Foreign Application Priority Data

Feb. 19, 1980 [DE] Fed. Rep. of Germany ....... 3006088

[51] Int. Cl.³ .............................................. B64C 27/38
[52] U.S. Cl. ............................... 416/134 A; 416/141; 416/230
[58] Field of Search .......... 416/134 A, 138 A, 140 A, 416/141, 230 A

[56] References Cited

U.S. PATENT DOCUMENTS

| | | | |
|---|---|---|---|
| 4,156,583 | 5/1979 | Mayerjak | 416/134 A X |
| 4,195,967 | 4/1980 | Weiland | 416/134 A |
| 4,255,087 | 3/1981 | Wackerle et al. | 416/134 A X |
| 4,257,738 | 3/1981 | Schwarz et al. | 416/134 A |

FOREIGN PATENT DOCUMENTS 2827320  1/1980  Fed. Rep. of Germany ... 416/134 A

Primary Examiner—Everette A. Powell, Jr.
Attorney, Agent, or Firm—Toren, McGeady & Stanger

[57] ABSTRACT

The rotor blades of a rotary wing aircraft are mounted at their blade roots upon a rotor head formed as an integral body of composite fiber material shaped to define a plurality of bifurcated rotor blade support arms between which the blade roots are mounted. Each of the blades is formed, at least in the region of the blade roots, with a laminated configuration including at least two layers formed with a fiber loop having a unidirectional fiber orientation extending longitudinally of the rotor blade and about a load-bearing connection between the blade root and the rotor head. An intermediate layer having a crosswise fiber orientation is provided between each of the at least two layers of the blade root which integrally joins the two layers and the fiber loop is enclosed by support members at its longitudinal edges at the inside and outside thereof at least in the region of the load-bearing connection.

5 Claims, 4 Drawing Figures

U.S. Patent
Oct. 5, 1982
4,352,632
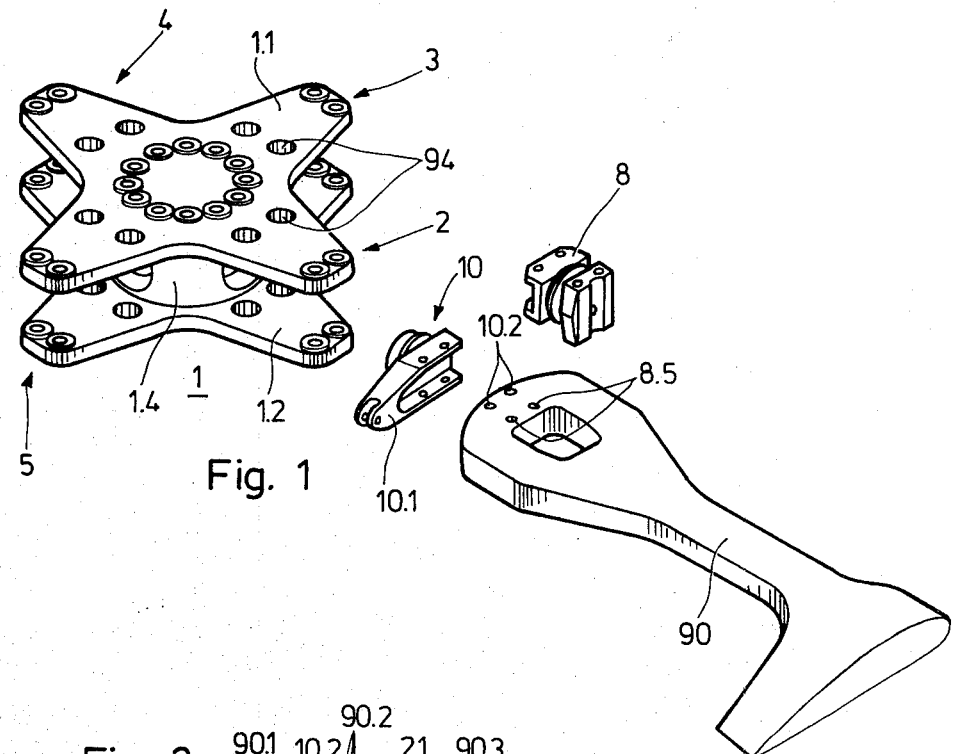
Fig. 1
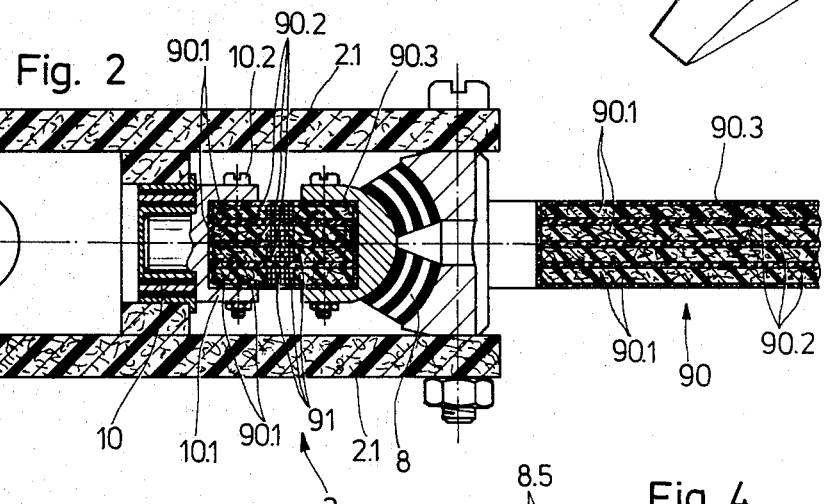
Fig. 2
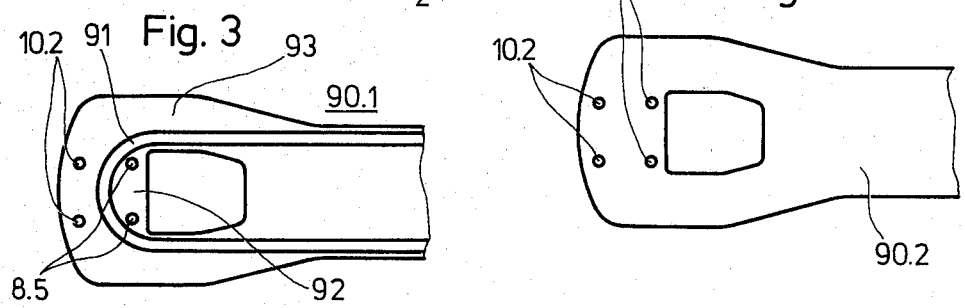
Fig. 3
Fig. 4

ROTOR MOUNTING ASSEMBLY FOR ROTARY WING AIRCRAFT

The present invention relates generally to an assembly for mounting the rotor blades of a rotary wing aircraft and, more particularly, to the type of assembly wherein the rotor head consists of a central headpiece formed as an integral body of fiber material defining a plurality of bifurcated rotor blade mounting support arms, with a blade root of each of the rotor blades being operatively connected to the central headpiece between each pair of support arms.

The device of the present invention is related to the assembly disclosed and claimed in U.S. Pat. No. 4,257,738.

In an assembly of the type to which the present invention relates, each of the rotor blades is mounted to the central headpiece forming the rotor head by a load-bearing connection which may include an elastomer bearing and which is capable of enabling the bearing of compressive stresses in the longitudinal direction of the rotor blade while allowing angular movement of the blade. The type of mounting assembly involved provides the capability for blade lagging movement into a folded position about the longitudinal axis of the compressive load-bearing connection which may be utilized as the swing axis. In order to diminish weight as much as possible, and to also lower material requirements and costs, it is desirable in this regard to eliminate the necessity for structurally adapting the blade root to the blade connecting means. In conventional devices, rotor blades of fiber-reinforced plastic material are used with fiber belts arranged in the form of blade connecting loops. However, separate intermediate members for bridging the distance from the blade root to the root of the blade support or the blade angle bearing which is to be arranged at this location are usually necessary.

The present invention is directed toward the task of omitting such intermediate members for bridging the compressive load-bearing connection while still providing the advantage of a rotor blade of fiber-reinforced plastic material having belts arranged in loops at the blade root so that the rotor blade will be capable of absorbing high stresses especially in the region of the blade root.

SUMMARY OF THE INVENTION

Briefly, the present invention may be described as a rotor head mounting assembly for mounting the rotor blades of rotary wing aircraft, wherein the blades are pivotally mounted at the blade root of each blade at the rotor head by blade angle bearings, the assembly being formed so that the rotor head is composed of a central headpiece having the rotor blades mounted thereon, the central headpiece being formed as an integral body of composite fiber material shaped to define a plurality of rotor blade mounting support arms each having a bifurcated configuration and adapted to mount a rotor blade therebetween. The rotor blade roots are mounted between the support arms by a load-bearing connection formed to enable bearing of compressive stresses in the longitudinal direction of the rotor blade while allowing angular movement thereof. The invention particularly comprises the improvement wherein the rotor blades are formed at least in the region of their blade roots with a laminated configuration of composite fiber material with at least two layers of the laminated configuration being formed with a fiber loop having a unidirectional fiber orientation which extends longitudinally of the rotor blade and about the load-bearing connection with its support point at the side of the blade root. An intermediate layer having a crosswise fiber orientation is provided between each of the at least two layers of the blade root which integrally joins said two layers. The fiber loop is enclosed by support members at its longitudinal edges at the inside and outside thereof at least in the region of the load-bearing connection.

By means of the blade root design with the compressive load-bearing connection, the fiber loops are capable of absorbing high tensile stresses for the absorption and transmission of centrifugal forces of the blades and can be produced in any desired design without difficulty. Therefore, the assembly may be adapted to a desired compact design of the blade root and, while having the same cross-section as a pure fabric structure, it may have approximately three times the strength under tensile load resulting, in combination with the intermediate layers and the support members capable of absorbing tensile and compressive loads, in a laminated body, at least at the blade root, which is as compact as possible in all directions of load application and which is functionally redundant even in the case of a damaged fiber loop. In addition, the requirement of enabling the assembly to be easily reproduced for economical mass production is achieved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 1 is an exploded perspective view showing parts of the rotor head connection of the assembly of the invention;

FIG. 2 is a cross-sectional view showing in greater detail the blade root mounting arrangement; and FIGS. 3 and 4 are plan views showing the configuration of different layers of the laminated blade root structure.

DETAILED DESCRIPTION OF THE PREFERRED EMBODIMENT

Referring now to the drawing, wherein like reference numerals are used to denote similar parts throughout the figures thereof, the rotor head assembly of a rotary wing aircraft in accordance with the present invention is depicted in FIGS. 1–4 with FIG. 1 showing, in exploded view and in perspective, the various parts of the assembly. The central part of the rotor assembly is a rotor head 1 which is formed as a unitary headpiece consisting completely of composite fiber material, the rotor head 1 being adapted to be directly connected with a rotor shaft (not shown) of the rotor device. The rotor head 1 is formed with four bifurcated blade support arms 2, 3, 4, 5. The rotor head assembly is composed of a pair of star-shaped plates 1.1 and 1.2 which are joined together to form the composite headpiece by an intermediate member 1.4. As a result of this configuration, each of the blade support arms 2–5 is formed as a bifurcated member having, for example in the case of the blade support arm 2, a pair of sides 2.1 between which the blade root of a rotor blade may be operatively connected.

As illustrated in FIG. 2, the assembly provides for each of the rotor blades connection means which include an elastomer bearing 8 operating to connect the respective rotor blade or its blade root 90 in a respective bifurcated rotor support arm 2. The elastomer bearing 8 is structured to fulfill the function of providing a connection between the blade root 90 and the sides 2.1 of the bifurcated support arm 2 which is capable of absorbing centrifugal forces of the blade. That is, the connection is adapted to absorb compressive stresses while still permitting rotary motion of the blade.

The blade root 90 extends beyond this elastomer bearing 8 to an extent such that it can be connected with a radial elastomer bearing 10. The radial elastomer bearing 10 is mounted at the root of the rotor arm 2 as a blade angle bearing and includes a bearing portion 10.1 which operates simultaneously as the connecting portion for a blade adjusting lever (not shown) which functions as a control lever.

In order to enable direct connection of the rotor blade or its blade root 90 with the blade support connecting means including the elastomer bearings 8 and 10 without the necessity for conventional blade fittings, the blade is formed with a multiple-layer laminated blade structure of fiber-reinforced plastic material. For example, the material utilized may be glass fibers in a synthetic resin matrix. In accordance with FIG. 2, and commencing from an outer layer 90.1, shown in more detail in FIG. 3, the laminated structure may be formed with the layers 90.1 arranged alternately adjacent layers 90.2. The layers 90.2 operate as an intermediate layer and integrally connect the adjacent two layers 90.1. The number of layers provided will depend upon strength requirements. For reasons of redundancy, at least two layers 90.1, configured as indicated in FIG. 3, should be provided with an intermediate layer 90.2, configured in accordance with FIG. 4. The reason for the difference in the respective design of the layers 90.1 and 90.2 lies in the different sources of loads on the blade root. That is, these loads will involve centrifugal forces on the blades as well as bending moments from blade flapping and blade lag movement.

For absorption and transmission of the centrifugal forces, a fiber loop 91 of a unidirectional fiber orientation is provided which extends in the longitudinal direction of the blade for each of the layers 90.1. The fiber loop 91 is wound around the axial-radial elastomer bearing 8 including its support point at the blade root and the respective connecting bores 8.5. The fiber loop 91 is enclosed or surrounded by inner and outer support members 92 and 93 which are formed to have a crosswise fiber orientation (e.g., fabric laminate) and are integrally connected to the longitudinal edges of the loop 91. Through an integral connection with the intermediate layers 90.2 which are coincidental with the layers 90.1 and which also have a crosswise fiber orientation, the support members 92 and 93 ensure stiffening of the blade root 90 necessary for the absorption of the blade moments. This is further improved by provision of a cover layer 90.3, which also has crosswise fiber orientation, and which is arranged to surround the overall blade root assembly including the layers 90.1 and 90.2 on all sides thereof.

All the connecting bores 8.5 and 10.2 for the elastomer bearings 8 and 10 exclusively cut through the fiber material having crosswise fiber orientation so that the fiber loops 91 can become fully effective for the function assigned thereto, that is, the elements which essentially absorb and transmit tensile forces.

Since all of the above blade elements can be reproduced by machines without problem, the rotor blade may be produced according to a modular system and may therefore be especially economically produced.

It should be mentioned that, for the aforementioned lagging of the blade into a folded position, throughbores 94 are arranged in the rotor head in such a way that the fastening bolts for the radial elastomer bearing 10 can be pulled therethrough.

While a specific embodiment of the invention has been shown and described in detail to illustrate the application of the inventive principles, it will be understood that the invention may be embodied otherwise without departing from such principles.

What is claimed is:

1. In a rotor head mounting assembly for the rotor of rotary wing aircraft having rotor blades each including a blade root pivotally supported at a rotor head by blade angle bearings, said rotor head being formed as an integral body of composite fiber material shaped to define a plurality of bifurcated rotor blade mounting support arms each having a rotor blade mounted therebetween, said rotor head being essentially composed of generally congruent plate members with intermediate spacer means located therebetween, said plate members and said spacer means being integrally joined together to form said rotor head as a unitary body of composite fiber material, each of said mounting support arms being equipped with load-bearing connection means for mounting between the sides of each of said bifurcated support arms a rotor blade root, said connection means being formed to enable bearing of compressive stresses in the longitudinal direction of a rotor blade while allowing angular movement of said blade, the improvement comprising that said rotor blades are formed at least in the region of said blade roots with a laminated configuration of composite fiber material, that at least two layers of said laminated configuration are formed with a fiber loop having a unidirectional fiber orientation which extends longitudinally of said rotor blade and about said load-bearing connection means and about its support point at the side of said blade root, that an intermediate layer having a crosswise fiber orientation is provided between each of said at least two layers which integrally joins said two layers, and that said fiber loop is enclosed by support members at its longitudinal edges at the inside and outside thereof at least in the region of said load-bearing connection means.

2. An assembly according to claim 1 wherein said load-bearing connection means comprise elastomer bearing means.

3. An assembly according to claim 2 wherein said elastomer bearing means comprise an axial-radial elastomer bearing operating cooperatively together with a radial elastomer bearing.

4. An assembly according to claim 1 wherein said at least two layers and said intermediate layer are in their totality surrounded on all sides by a cover layer having crosswise fiber orientation.

5. An assembly according to claims 1 or 4 wherein said blade root is formed with connecting bores for said load-bearing connection means, said bores extending exclusively through said cover layer, said support members and said intermediate layer.

* * * * *